United States Patent [19]

Votteler

[11] 4,359,846
[45] Nov. 23, 1982

[54] SEALING ARRANGEMENT FOR LOADING DOOR

[75] Inventor: Hans Votteler, Reutlingen, Fed. Rep. of Germany

[73] Assignee: Reiff GmbH, Reutlingen, Fed. Rep. of Germany

[21] Appl. No.: 171,417

[22] Filed: Jul. 22, 1980

[30] Foreign Application Priority Data

Jul. 26, 1979 [DE] Fed. Rep. of Germany ....... 2930295

[51] Int. Cl.³ .................................................. E04H 14/00
[52] U.S. Cl. ................................. 52/173 DS; 14/71.5
[58] Field of Search .................... 14/71.5; 52/173 DS, 52/79.8; 296/166

[56] References Cited

U.S. PATENT DOCUMENTS 2,841,832  7/1958  Couse ................................ 52/79.8
3,875,954  4/1975  Frommelt ....................... 52/173 DS
4,104,836  8/1978  Weibull ......................... 52/173 DS

FOREIGN PATENT DOCUMENTS 1922023  12/1970  Fed. Rep. of Germany ... 52/173 DS
2207190   6/1976  Fed. Rep. of Germany .
2018988  10/1979  Fed. Rep. of Germany ... 52/173 DS Primary Examiner—Price C. Faw, Jr.
Assistant Examiner—Henry E. Raduazo
Attorney, Agent, or Firm—Michael J. Striker

[57] ABSTRACT

A sealing arrangement for a loading door has three flexible sealing elements extending along two lateral edges and one upper edge of a door opening and movable between an inoperative position in which the flexible sealing elements are located in the plane of the door opening, and an operative position in which they are withdrawn from this plane and extend into the interior of a container or the like so as to abut against the inner walls of the latter. The proximal end portions of the sealing elements overlap one another.

6 Claims, 3 Drawing Figures

SEALING ARRANGEMENT FOR LOADING DOOR

BACKGROUND OF THE INVENTION

The present invention relates to a sealing arrangement for a lockable door of a building. More particularly, it relates to a lockable door of a building which has sealing elements of elastic material extending along the periphery of the door opening and spring-biased against the walls of a container which is brought in front of the door.

Sealing arrangements of the above-mentioned general type are known in the art. A known arrangement has hollow rubber beads which are provided around a loading door on the outer wall of a building. A container with its opening side or a truck with its rear end side abuts against the beads. Another arrangement is also known in which the loading door is provided with projecting blocks with flexible rubber walls reinforced by spring steel bands. A truck or a container with their opening sides move along the rubber walls while the latter inwardly deflect. It is also known to subdivide the flexible walls into several individual lamellas which are arranged parallel to one another, in order to provide improved matching of the walls to the outer contour of the container or the like.

In all known sealing arrangements, the sealing is performed between the rubber walls or lamellas, on the one hand, and an outer face or an outer edge of the container standing in front of the door. However, this sealing is not sufficient in many cases, inasmuch as the container is frequently provided with outwardly pivotable doors at its loading side. Thereby, complete sealing between the outwardly pivoted doors of the container and the edge of the loading door of the building cannot be attained by the sealing lamellas abutting against the pivotable door or its edges. The known arrangement has a further disadvantage in that in condition of abutment against the outer side of loading parts of the truck, the sealing lamellas often contact with protruding hinges of the doors or other projections. In the process of loading or unloading of the vehicle, vertical movement of the loading surface of the vehicle because of the loading or unloading of the vehicle suspension takes place. Thereby, the lamellas which hang upon the projections of the vehicle can be torn off because of the above-mentioned vertical movement.

SUMMARY OF THE INVENTION

Accordingly, it is an object of the present invention to provide a sealing arrangement for a loading door of a building or structure, which avoids the disadvantages of the prior art.

More particularly, it is an object of the present invention to provide a sealing arrangement which guarantees improved sealing as compared with the known arrangements.

In keeping with these objects and with others which will become apparent hereinafter, one feature of the present invention resides, briefly stated, in a sealing arrangement which includes three flexible sealing elements extending along two lateral edges and an upper edge of the door opening and movable between an inoperative position in which the sealing elements extend in a plane of the door opening and an operative position in which the sealing elements extend into the interior of the container so as to abut against the walls of the latter, wherein the proximal end portions of the sealing elements overlap one another in the operative position.

The sealing elements may be mounted on three tubular locking spring elements which pivot the sealing elements between the operative and inoperative position. The spring locking elements may be locked and thereby retain the sealing elements in the inoperative position, and when the spring locking elements are unlocked they move the sealing elements to the operative position.

The end portions of the upper sealing element in the inoperative position may extend laterally beyond the respective end portions of the lateral sealing elements and may be free and flexible, so that in the operative position the end portions of the upper sealing element overlap the end portions of the lateral sealing elements.

Each lateral sealing element has an upper portion and a lower portion which are arranged so as to buckle or deflect. On the other hand, the central portions of the sealing elements located between the end portions thereof may be provided with reinforcements formed by a reinforcing insert. The sealing elements may be constituted of rubber material.

The inner walls of containers or box structures of trucks are always smooth and have no sharp projections up to the opening to be sealed. Thereby, when the arrangement is designed in accordance with the present invention, the elastic sealing elements abut against the smooth inner walls and thereby guarantee a sufficient sealing action. The sealing elements or lamellas which are arranged in accordance with the principle of swinging doors also provide good compensation for width and height differences between the door opening and the opening of a container to be loaded. When the elastic sealing elements are swung outwardly from the door opening plane, the proximal end portions of the sealing elements overlap one another in the upper corners of the container inner space so as to provide for good sealing in this region. More particularly, the upper sealing element overlaps the upper edge of the lateral sealing elements in the region of the upper corners. A sealing by the sealing elements in the bottom region of the door opening is not provided, inasmuch as in this region the sealing can be performed by overload bridges or passage plates.

The arrangement designed in accordance with the present invention allows a vertical movement of the container to be sealed because of loading or unloading of the suspension of the vehicle, without damaging the sealing elements. The end regions of the sealing elements are strongly flexible and advantageously can buckle. Thereby, the lateral sealing elements can compensate for height differences which take place during the loading or unloading, without difficulties and without the danger of tearing of the sealing elements. As for the upper sealing element, a height adjustment causes only changes in its pivotal position.

When the arrangement in accordance with the invention is in its inoperative position, the elastic sealing elements are located in the plane of the door opening, and the spring locking elements are locked. The sealing arrangement assumes its operative position first when a container or a vehicle to be loaded is located in front of the loading door. In the inventive arrangement, it is not necessary to worry about damage during driving the vehicle or container up to the loading door.

Finally, the sealing arrangement in accordance with the present invention provides for effective weather protection and allows to keep losses of heat in the warehouses and manufacturing facilities provided with the loading door, within economical limits.

The novel features which are considered as characteristic for the invention are set forth in particular in the appended claims. The invention itself, however, both as to its construction and its method of operation, together with additional objects and advantages therefor, will be best understood from the following description of specific embodiments when read in connection with the accompanying drawings.

DESCRIPTION OF THE PREFERRED EMBODIMENTS

Figure 1:
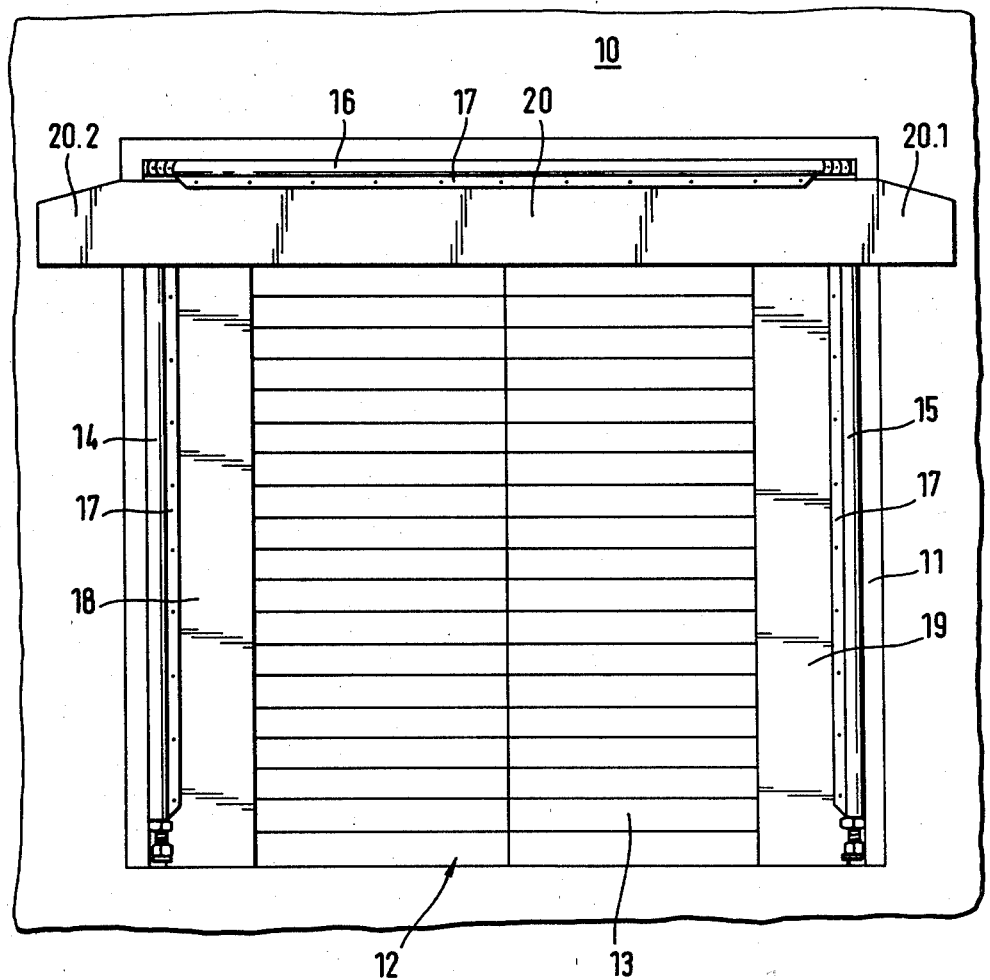
FIG. 1 is a view showing a sealing arrangement in accordance with the present invention, which is in an inoperative position and closes a loading door.

FIG. 1 shows a wall of a building or structure, which is identified by reference numeral 10. The wall 10 has a loading door with a loading opening 12 bounded by an outer frame 11. The opening 12 is closed by a roller blind 13.

Locking spring devices 14,15 and 16 are arranged along two lateral edges and one upper edge of the outer frame 11. The locking spring devices are elongated and pivotal about their longitudinal axes. Such locking spring arrangements for swinging doors are known and described, for example, in the German Pat. No. 2,207,190. The locking spring devices 14,15 and 16 are tubular, and their outer tubes carry longitudinal strips or bars 17. Elastic sealing elements or walls 18,19 and 20 are mounted by their longitudinal edges on the strips 17.

In FIG. 1, the sealing walls 18,19 and 20 are swung inwardly and located in the plane of the door opening 12. In this position, the tubular locking spring devices 14, 15 and 16 are spring-biased and locked. The locking means for the locking spring devices may have different constructions. They are not shown in the drawing inasmuch as they do not form a part of the present invention.

As can be seen from the drawings, the longitudinal strip 17 and thereby the mounting region of the sealing walls 18,19 and 20 do not extend up to the ends of the sealing walls. Thereby, all sealing walls are freely movable in the region of their ends. As can be seen from FIG. 1, the upper sealing wall 20 has two end portions 20.1 and 20.2 which in the shown inoperative position extend laterally outwardly beyond the lateral sealing walls 18 and 19 to a considerable extent.

The sealing walls 18–20 are more flexible in the region of their end portions than in their central region. In the central region, the sealing walls 18–20 may be reinforced by a not-shown fabric layer or insert.

Figure 2:
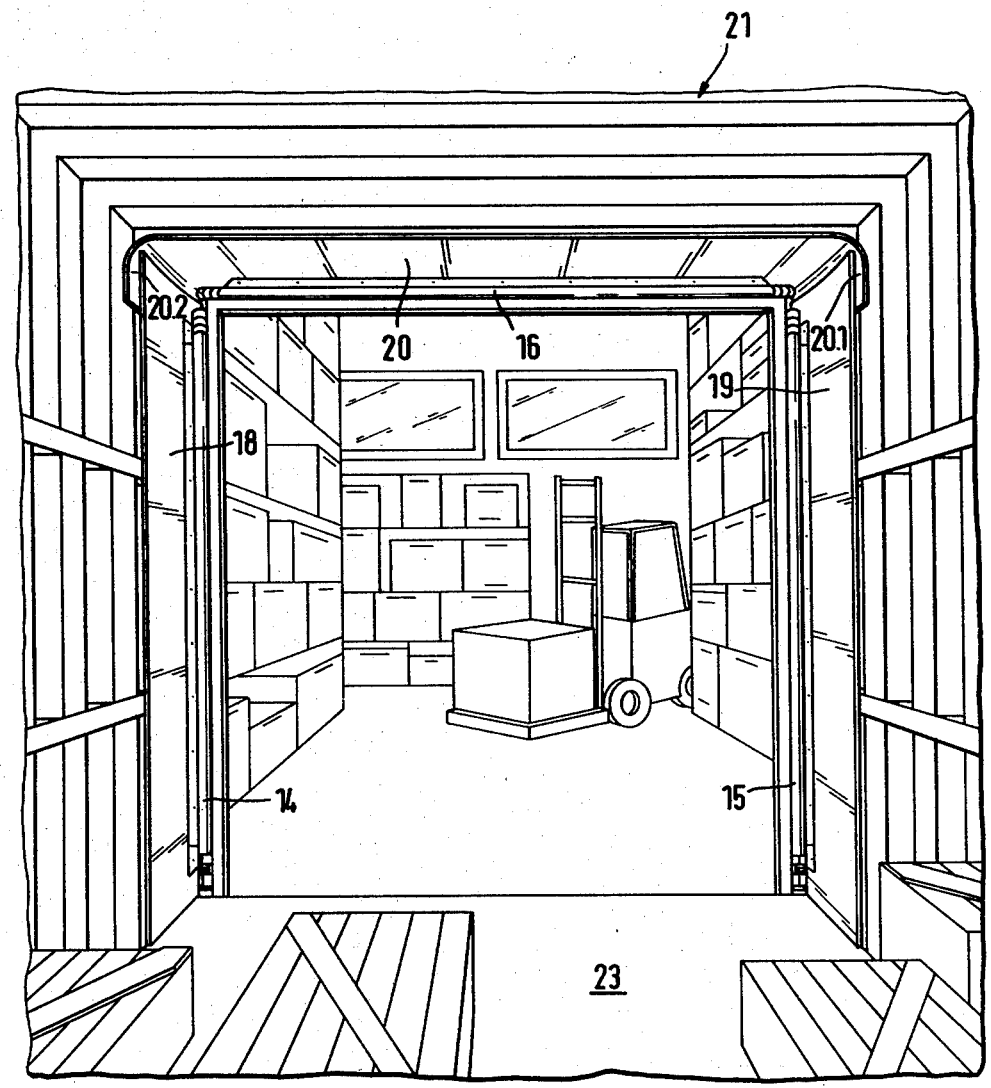
FIG. 2 is a view from a container showing the sealing arrangement in accordance with the present invention in operative position in which the door is open.
Figure 3:
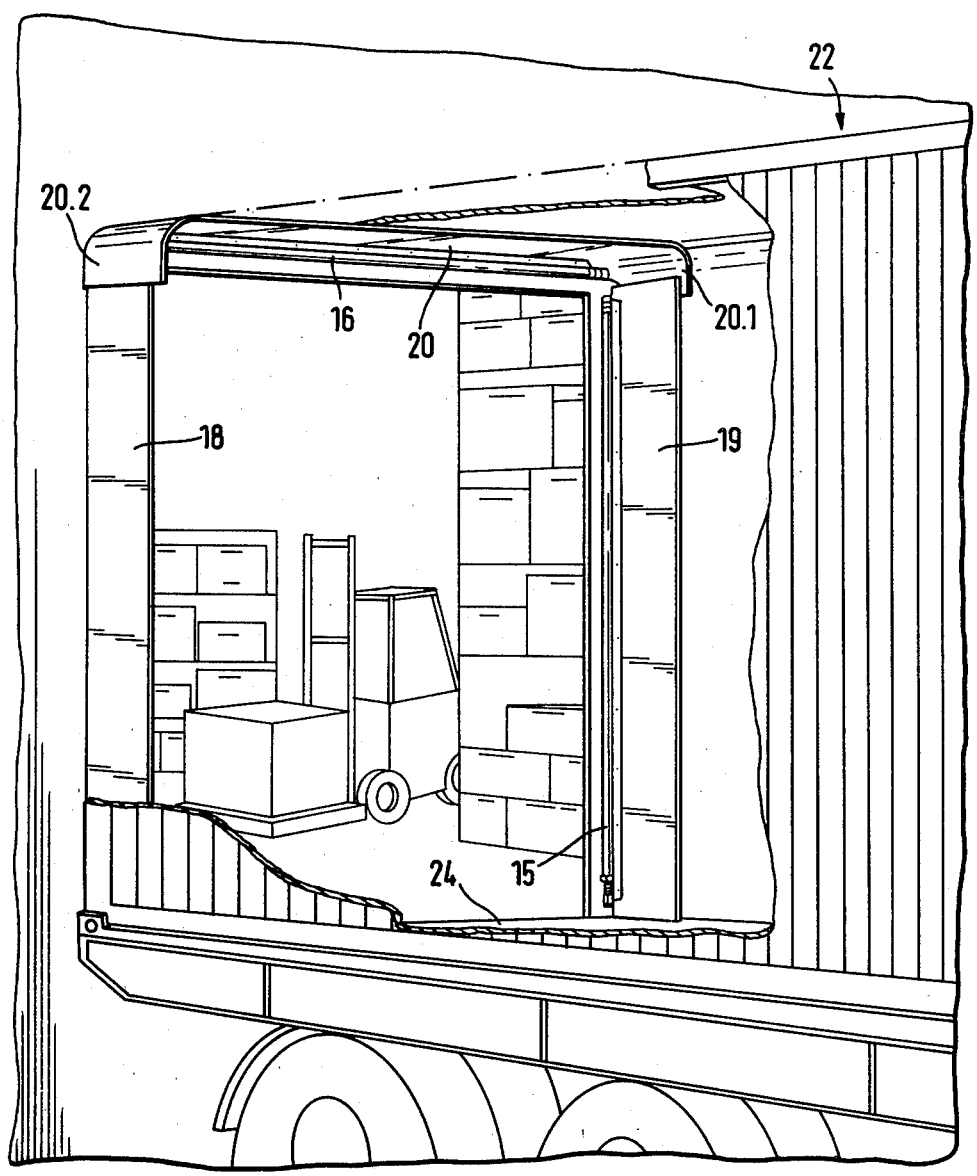
FIG. 3 is an oblique view of the sealing arrangement in accordance with the present invention, in its operative position.

FIGS. 2 and 3 show objects to be loaded through the loading door provided with the inventive sealing arrangement. FIG. 2 shows a container 21 whereas FIG. 3 shows a truck 22. The folding doors of the container 21 or the truck 22 are opened by swinging toward the outer surfaces of the lateral walls. An end side of the container 21 or the truck 22 which is thereby opened is placed near the loading door. The roller blind 13 of the door opening 12 is opened, and the tubular locking spring devices 14,15 and 16 of the sealing arrangement are unlocked. The sealing walls 18–20 are swung outwardly from the plane of the door opening 12 by the locking spring arrangement 14–16 and moved inwardly of the container 21 or the truck 22 so as to abut tightly against the smooth inner walls of the latter. This is clearly shown in FIGS. 2 and 3.

At the same time, the end portions 20.1 and 20.2 of the upper sealing wall 20 bend and are pressed by the upper edges of the lateral sealing walls 18 and 19 against the inner wall of the container 21 or the truck 22. As a result of this, very good sealing is attained between the edge of the opening 12 of the loading door and the container 21 or the truck 22, whereby cold air cannot enter the interior of the building or structure at the edge of the door opening 12. A gap between a bottom 23 of the container 21 or a loading platform 24 of the truck 22 can be overlapped by a passage bridge which is not shown in the drawing.

In many cases, the dimensions of the opening of the loading door and of the opening of the trucks and containers correspond to one another. This is true, first of all, for the vertical dimensions. Deviations in the width can be compensated by the lateral sealing walls 18 and 19. The width of the lateral sealing walls 18 and 19 are selected correspondingly, and when the width deviations take place, the lateral sealing walls 18 and 19 are swung from their inoperative position of FIG. 1 by an angle which is smaller or greater than 90°.

The sealing walls are constituted of flexible materials such as, for example, a rubber material. While the overlapping of the end portions of the sealing elements in the upper corners is performed by the end portions 20.1 and 20.2 of the upper sealing element 20, this overlapping may also be performed by extensions of the upper end portions of the lateral sealing elements 18 and 19.

It will be understood that each of the elements described above, or two or more together, may also find a useful application in other types of constructions differing from the types described above.

While the invention has been illustrated and described as embodied in an arrangement for sealing a loading door, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A sealing arrangement for a loading door which has a body with an opening provided with one upper and two lateral edges and arranged to be associated with a container which has one upper and two lateral walls, the arrangement comprising sealing means having three flexible sealing elements, said sealing elements including two lateral flexible elements each extending along one of the lateral edges of the opening of the door body and an upper sealing element extending along the upper edge of the same; and means for moving said sealing elements between an inoperative position in which said sealing elements extend in a plane of the opening of the door body and an operative position in which said sealing elements are withdrawn from the plane of the opening of the door body and extend into the interior of the container so as to abut against the walls of the latter, said upper sealing element and each of said lateral sealing elements having two end portions arranged so that one end portion of said upper sealing element and one end portion of each of said lateral sealing elements overlap one another in said operative position.

2. An arrangement as defined in claim 1, wherein said moving means includes three tubular locking spring elements each extending along a respective one of the edges of the opening of the door body and mounting a respective one of said sealing elements for pivoting between said operative and inoperative positions.

3. An arrangement as defined in claim 2, wherein said locking spring elements are arranged so that when they are locked they retain said sealing elements in said inoperative position, and when they are unlocked they move said sealing elements to said operative position.

4. An arrangement as defined in claim 1, wherein each of said end portions of said upper sealing element in said inoperative position extends laterally beyond said one end portion of a respective one of said lateral sealing elements and is free and flexible, so that in said operative position each of said end portions of said upper sealing element overlaps said one end portion of a respective one of said lateral sealing elements.

5. An arrangement as defined in claim 1, wherein said one end portion of each of said lateral sealing elements is an upper end portion, each of said lateral sealing elements having another end portion which is a lower end portion, said upper and lower end portions of each of said lateral elements being arranged so as to buckle.

6. An arrangement as defined in claim 1, wherein each of said sealing elements is constituted of rubber material.

* * * * *